March 2, 1926.
L. E. MURPHREE
1,574,840
ALFALFA CULTIVATOR
Filed June 13, 1923
2 Sheets-Sheet 1
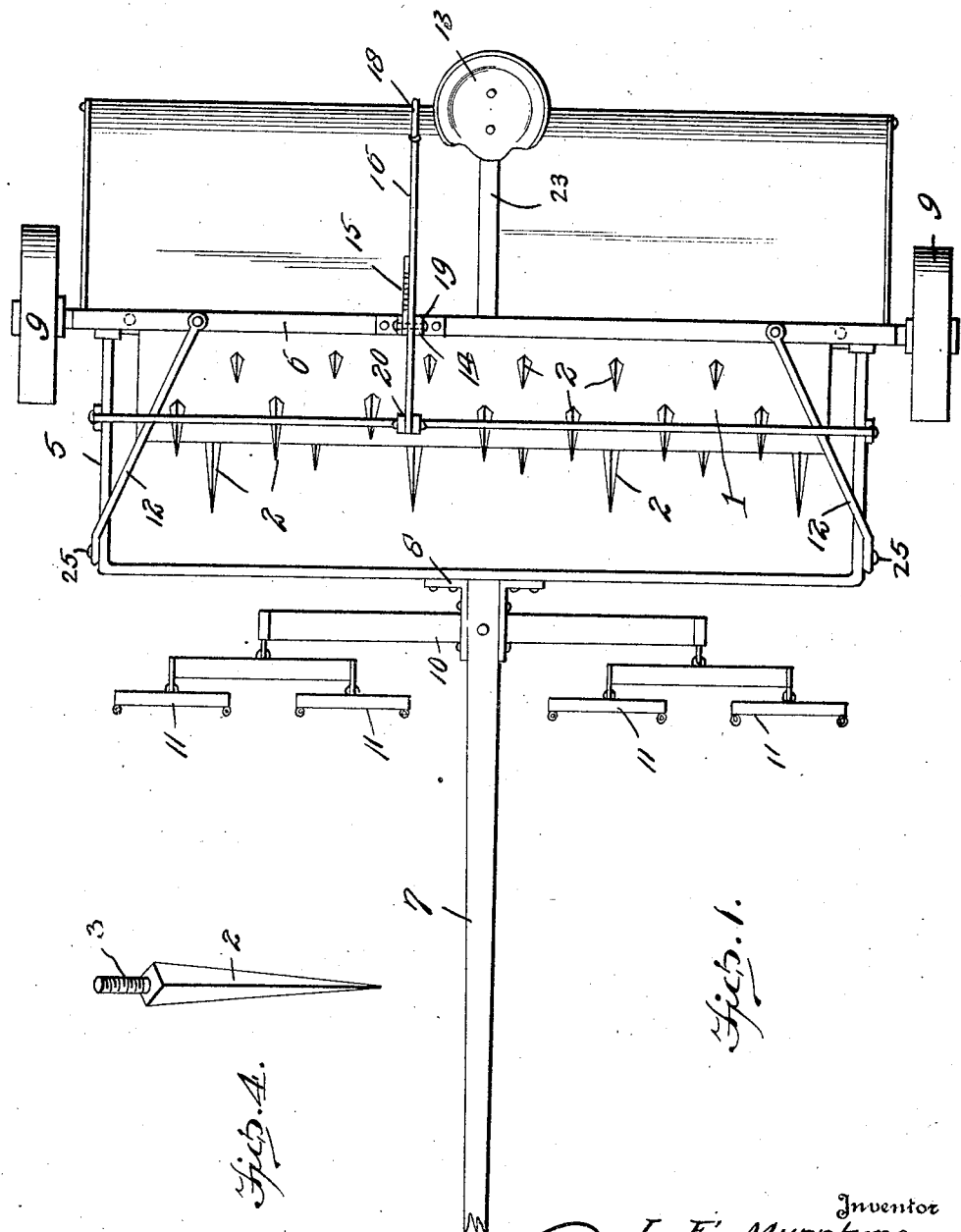

March 2, 1926.
L. E. MURPHREE
1,574,840
ALFALFA CULTIVATOR
Filed June 13, 1923   2 Sheets-Sheet 2
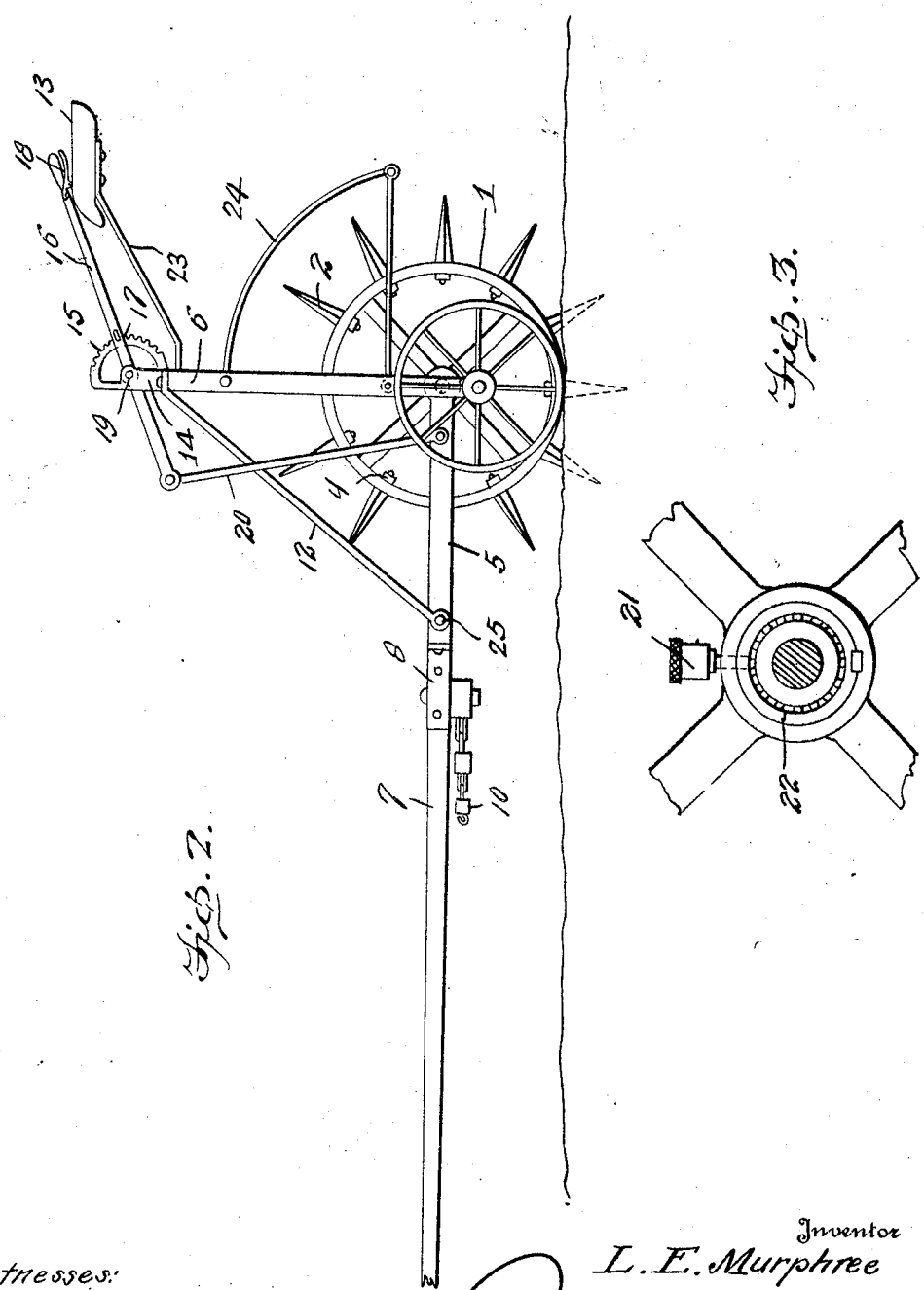

Patented Mar. 2, 1926.

1,574,840

UNITED STATES PATENT OFFICE.

LOID E. MURPHREE, OF CHANDLER, ARIZONA.

ALFALFA CULTIVATOR.

Application filed June 13, 1923. Serial No. 645,071.

*To all whom it may concern:*

Be it known that I, LOID E. MURPHREE, a citizen of the United States, residing at Chandler, in the county of Maricopa and State of Arizona, have invented certain new and useful Improvements in Alfalfa Cultivators, of which the following is a specification.

This invention has reference to alfalfa cultivators, and is designed to agitate or stir up the surface of the field to pulverize such surface freely and so contribute to the action of the machine in use.

The invention will be best understood from a consideration of the following detailed description taken in connection with the accompanying drawings forming a part of this specification, with the understanding that the invention is not confined to any strict conformity with the showing of the drawings, but may be changed and modified as long as such changes and modifications mark no material departure from the salient features of the invention as expressed in the appended claim.

In the drawings:

Figure 1 is a plan view of the cultivator.

Figure 2 is a side elevation thereof.

Figure 3 is a detail view of one of the bearings for the ground wheels.

Figure 4 is a perspective view of one of the spikes forming part of the roller.

Referring to the drawings, there is shown in Figure 1, a roller 1 of suitable size and length, and of skeleton form, and carrying circular series of spikes 2, each of sharpened pyramidal form, terminating at the butt end in a threaded extension 3 extending through the walls of the roller 1, and held to said walls by a nut 4, the spikes 2 radiating from the roller.

The roller 1 is provided with a frame 5 extending from an axle 6 and projecting entirely across the front of the roller 1. Attached to the frame 5 is a forwardly projecting pole 7 connected by brackets 8 to the frame 5, and in turn connected to the axle 6, at the ends of which are mounted ground wheels 9.

Secured fast to the pole 7 is a whipple tree 10 carrying draft eveners 11 for the attachment of draft animals, and the frame 5 is further strengthened by braces 12 attached to the frame 5 and to the axle 6.

Secured to the axle 6 is a driver's seat 13, and alongside of the driver's seat, there is located a post 14 carrying at the upper end, a rack segment 15, and movable about the rack segment is a lever 16 having an adjusting tooth 17 and an adjusting pawl 18, the lever 16 having a pivot connection 19 with a link 20 connected to the pole 7, the arrangement being such that the pole may be adjusted about the axis of the roller 1, as desired. A shield 24 is carried by the axle 6, extending rearwardly and downwardly therefrom to cover the rear upper portion of the drum.

In Figure 3, there is shown a lubricating cup 21 associated with a series of ball bearings 22 for reducing the friction of movement of the roller.

In use, the forward end of the tongue 7 is connected with the neck yoke (not shown) of the draft animals in a usual manner. The occupant of the seat 13 may swing the lever 16 whereby the frame 8 and tongue 7 are swung with relation to the braces 12 and consequently the spike 2 may be raised or lowered with relation to the surface of the soil and consequently the spikes may be supported to operate in the soil at a desired distance below the surface thereof.

Having thus described my invention, what I claim as new, and desire to secure by Letters-Patent, is:

A cultivator comprising a wheel mounted axle, the axle having an arched intermediate portion, forwardly and downwardly disposed braces mounted upon the arched portion of the axle, a frame including a draft tongue pivotally connected with the forward lower ends of the braces, said frame having a rear end portion which is disposed under the arch of the axle, a drum journaled for rotation at the rear end portion of the frame and provided with radially disposed spikes, a lever fulcrumed upon the arched portion of the axle and a link rod pivotally connected at one end with the working end of the lever and pivotally connected at its other end with the frame at a point in advance of the axis of the drum.

In testimony whereof I affix my signature.

LOID E. MURPHREE.